March 28, 1950 D. B. DEWEY 2,501,994
CONTROL MEANS FOR REGULATING FEATHERING MEMBERS
Original Filed April 9, 1940
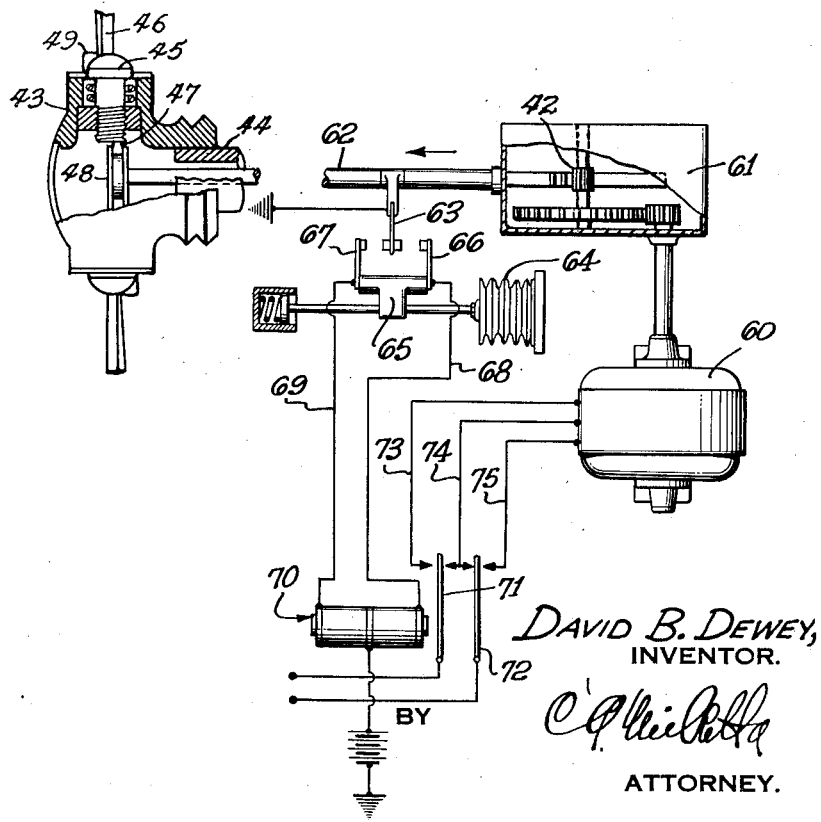
DAVID B. DEWEY,
INVENTOR.
BY
ATTORNEY.

Patented Mar. 28, 1950

2,501,994

UNITED STATES PATENT OFFICE 2,501,994

CONTROL MEANS FOR REGULATING FEATHERING MEMBERS

David Brainard Dewey, Pasadena, Calif.

Original application April 9, 1940, Serial No. 328,706. Divided and this application March 28, 1944, Serial No. 528,408

4 Claims. (Cl. 170—160.13)

This invention pertains to improvements in methods and means of controlling the pitch of blades and other members mounted for feathering movement upon a rotatable shaft.

In its most specific embodiment the present invention is directed to means and methods whereby the pitch of fans or other bladed elements rotatably mounted upon shafts may be controlled automatically, as for example by electrical means. This application is a division of my application filed April 9, 1940, as Serial No. 328,706, now Patent No. 2,354,948.

The motors or engines used in trucks, tractors, power shovels, passenger busses, power plants and industrial units such as derricks, etc., are ordinarily provided with a liquid cooling system comprising a radiator and a pump for regulating the cooling liquid around the motor and then through the radiator. Fans are provided, such fans being driven by the motor or engine, for passing cooling air through the radiator or around the cylinders for the purpose of reducing the temperature thereof, such means being particularly designed to prevent the motor from overheating. During winter months, such cooling system will ordinarily cool the motor to below a desired effective working range and additional devices, such as adjustable louvres, are ordinarily positioned around the radiator for the purpose of preventing cooling air from being sucked or blown through the radiator when the air temperature is so low that an inordinately low temperature exists in the cooling liquid. It is to be noted, however, that the fans are constantly driven as long as the motor is being operated. On large trucks it has been found that a very appreciable amount of power is consumed in driving the fan. A truck engine of 100 horsepower rating may, at top engine speed, expend 20 horsepower in driving the fan.

In many cooling towers where large quantities of water are continuously cascaded over louvres for the purpose of cooling the same, large fans are employed for maintaining a circulation of air through the falling water so as to facilitate evaporation and reduce the temperature to a predetermined point.

The present invention permits the maintenance of an effective operating pitch to any and all bladed elements carried upon a shaft so that, for example, in the case of a fan adapted to pass air through the cooling system of an internal combustion motor, the pitch of the fan blades is automatically varied in accordance with the temperature of the air passing through the radiator or the temperature of the engine without the necessity of employing additional louvres, shutters, or the like. In the event the present invention is adapted to a fan blower or other device, the pitch of the blades and the volume of air circulated thereby may be automatically controlled and modified by means of temperature responsive devices which actuate and move the movable elements designed to shift or change the pitch of the blades.

An object of the present invention is to disclose and provide means and methods whereby the movement of members mounted upon rotatable shafts, each of said members being rotatable on an axis perpendicular to the axis of the shaft, may be automatically and readily controlled.

A still further object of the present invention is to provide electrically operated means capable of adjusting the pitch or feathering angle of members rotatably mounted upon a shaft, in response to temperature changes.

These and other objects, uses and advantages of the present invention will become apparent to those skilled in the art from the following detailed description of certain illustrative embodiments embracing the discoveries herein referred to. In order to facilitate understanding of the invention, reference will be had to the appended drawings, in which:

The figure is a diagrammatic representation of certain elements which may be employed in electrically and automatically controlling the pitch of a blade in accordance with temperature changes.

The devices and improvements of this invention may be used with any hub or mount for fan or propeller blades, but preferably with a hub or mount which includes a member, movable axially of the fan shaft, axial motion of the member being then translated by suitable means into a feathering movement of the fan blades. One form of such mount is shown in my prior Patent No. 2,225,209; another modified form is shown in another patent. The present invention, however, is not limited to arrangements where bellows or a temperature-responsive device is mounted in the hub (as shown in the lastmentioned patent), but instead permits the controlling mechanism to be located wherever desirable, as for example, in a stream or body of cooling water or cooled water (as in mechanical draft cooling towers) and at a distance from the fan shaft or hub. In many large installations as, for example, in water cooling towers, very large bladed elements are driven and a bellows or other thermoresponsive device does not generate sufficient power to actuate the feathering elements. The present invention therefore contemplates the use of motor drives for actuating whatever movable element is embodied in the hub of the bladed device for changing the pitch of the blades.

The figure illustrates a form of remote control in which a motor 60, through suitable gearing contained in the gear case 61, is capable of moving a rod 62 in a reciprocable manner. The rod 62 may be connected to an element which, by its movement, controls the pitch of the blades. The gearing in the gear case 61 may include suitable gear and pinion reduction means terminating in a pinion 41 in egagement with a rack carried by the end of the rod 62, although any other form of gearing capable of permitting the motor 60 to reciprocate the rod 62 may be employed. For purposes of illustration, the rod 62 is shown extending into a hub 43 mounted for rotation upon a hollow shaft 44. Radially extending studs 45 are carried by the hub, such studs carrying the fan blades 46. Each of the studs is suitably journaled within the hub for rotative movement along an axis perpendicular to the shaft 44 and concentrically related rod 62. The lower or inwardly extending end of each stud 45 is provided with an offset, eccentrically positioned pin 47 which extends into a circular raceway formed in the element 48 rotatably carried by the end of rod 62. Each of the studs 45 may be provided with a weighted element 49 constituting means adapted to produce a negative torque tending to incompletely counteract the positive torque which is developed when the hub carrying the blades is rotated, such positive torque tending to rotate each of the blades into a plane perpendicular to the axis of the rotatable shaft or hub. The use of such means is clearly described in my Patent No. 2,354,948, filed April 9, 1940. When the blades are in a plane perpendicular to the axis of the rotatable shaft, their angle of pitch is substantially nil and a tremendous amount of power needs to be applied to whatever mechanism is provided for varying the angle of pitch of the blades in order to produce an adjustment in the pitch or feathered angle. By partially neutralizing this positive torque, as by means of the mass 49, the pitch angle is readily varied without the expenditure of much power. However, the present invention may be used with various types of blades or feathering elements.

Since the pins 47 are eccentric and extend into the raceway of member 48, axial movement of member 48 will vary the pitch of the blades 46 carried by studs 45.

The member 62 is provided with a contact arm 63 suitably mounted. A metal bellows or other thermo-responsive device 64 carries an insulating bar 65 provided with contact points 66 and 67 connected as by leads 68 and 69 to a differential-type holding relay 70 supplied with current from a battery or other source of energy. The movable switch arms 71 and 72 of this neutral position, double acting differential relay are connected to a source of electrical energy and are adapted to selectively close circuits causing the motor 60 to either run in one direction or another. For example, in the event the metal bellows 64 is subjected to increasing temperatures, it will expand and cause the contact 66 to move toward and engage contact 63, thereby closing a circuit through line 68 to the relay 70. The switch arms 71 and 72 will then move so as to close the circuit with lines 73 and 74 respectively, causing the motor to be so operated as to move the rod 62 in the direction of the arrow. As soon as there is any movement in the rod 62, contact between 63 and 66 will be broken but since relay 70 is of a predetermined holding type, the motor will continue to operate for a predetermined period, say 1, 3 or 5 seconds. The holding time should not be sufficient to cause the contact 63 to be moved into electrical engagement with the contact 67, however. After the expiration of this predetermined holding time, the switch arms 71 and 72 will assume their normal neutral position. If, however, the temperature continues to increase, the metal bellows 64 will again cause the closure of contact between 66 and 63 and the operation hereinabove described is repeated. The thermoresponsive device 64 may be of any desired type, but in the drawing is shown as a metallic sealed bellows which may be filled with a suitable liquid having desired expansion characteristics with temperature changes.

In this manner, the pitch of the blades may be progressively increased in increments. When temperature begins to drop, a progressive decrease in pitch is attained since closure of the circuit between 63 and 67 will energize the holding relay 70 through line 69 and cause the switch arms 71 and 72 to close the circuit from the source of power to the motor by lines 74 and 75.

Many Diesel powered and even gasoline powered trucks are at present so arranged that when the truck is running along level ground, the motor will over-cool even though the fan is removed. For this reason, it has been found desirable to associate the mechanism described herein with a shutter control. Adjustable shutters or louvres are often used on trucks, busses and other vehicles for the purpose of preventing large volumes of air from passing through the radiator when the air temperature is low. Such shutters may be actuated by a thermoresponsive device as, for example, the bellows 64, or the like. In this manner the shutters may be maintained in closed position whenever the fan blades are in feathering position and the shutter could be progressively opened as the pitch of the fan blades is increased. Simultaneous control by both the shutter and the fan is conducive to most efficient operation.

It is to be understood that numerous other arrangements may be employed in automatically controlling the position of any adjustable members carried by a rotating shaft and that the examples herein given are simply illustrative of methods whereby the position of the movable elements may be either changed progressively or wholly.

All changes and modifications coming within the scope of the appended claims are embraced thereby.

I claim:

1. Means for controlling the pitch of blades mounted for feathering movement upon a rotatable shaft comprising, in combination with a movable member operably associated with such rotatable shaft for regulatably adjusting the pitch angle of such blades: an electric motor operably connected to drive said movable member, said operable connection including a reduction gearing, a forward drive circuit for the motor, a reverse drive circuit for the motor, and a control circuit for alternatively energizing either of the drive circuits, said control circuit including switch means actuated by a temperature responsive device for closing the control circuit and a holding relay, said relay opening the drive circuits after a predetermined length of time.

2. Means for controlling the pitch of blades mounted for feathering movement upon a rotatable shaft comprising, in combination with a movable member operably associated with such rotatable shaft for regulatably adjusting the pitch angle of such blades: an electric motor operably connected to drive said movable member, said operable connection including a reduction gearing, a forward drive circuit for the motor, a reverse drive circuit for the motor, a control circuit for alternatively energizing either of the drive circuits, said control circuit including switch means actuated by a temperature responsive device for closing the control circuit, a holding relay, said relay opening the drive circuits after a predetermined length of time, and means for opening the control circuit.

3. Means for controlling the pitch of blades mounted for feathering movement upon a rotatable shaft comprising, in combination with a movable member operably associated with such rotatable shaft for regulatably adjusting the pitch angle of such blades: an electric motor operably connected to drive said movable member, said operable connection including a reduction gearing, a forward drive circuit for the motor, a reverse drive circuit for the motor, a control circuit for alternatively energizing either of the drive circuits, said control circuit including switch means actuated by a temperature responsive device for closing the control circuit and a holding relay, said relay opening the drive circuits after a predetermined length of time, and means driven by the motor for opening the control circuit.

4. Means for controlling the pitch of blades mounted for feathering movement upon a rotatable shaft, comprising, in combination with a movable member operably associated with such rotatable shaft for regulatably adjusting the pitch angle of such blades: an electric motor operably connected to drive said movable member, said operable connection including a reduction gearing, a forward drive circuit for the motor, a reverse drive circuit for the motor, a control circuit for alternatively energizing either of the drive circuits, said control circuit including switch means actuated by a temperature responsive device for closing the control circuit and a holding relay, said relay opening the drive circuits after a predetermined length of time, and means driven by the motor for opening the control circuit.

DAVID BRAINARD DEWEY.

REFERENCES CITED

The following references are of record in the file of this patent:

UNITED STATES PATENTS

| Number | Name | Date |
|---|---|---|
| 1,327,381 | Furber | Jan. 6, 1920 |
| 1,793,653 | Turnbull | Feb. 24, 1931 |
| 1,810,159 | Carol | June 16, 1931 |
| 1,830,858 | Schoepp et al. | Nov. 10, 1931 |
| 1,900,586 | Rippe | Mar. 7, 1933 |
| 1,978,788 | Fergason | Oct. 30, 1934 |
| 2,020,366 | MacCallum | Nov. 12, 1935 |
| 2,076,616 | Clarridge | Apr. 13, 1937 |
| 2,081,762 | Nissen | May 25, 1937 |
| 2,128,983 | Blanchard | Sept. 6, 1938 |
| 2,189,888 | Endsley | Feb. 13, 1940 |
| 2,195,036 | Palmer | Mar. 26, 1940 |
| 2,195,697 | Ellis | Apr. 2, 1940 |
| 2,225,209 | Dewey | Dec. 17, 1940 |
| 2,228,776 | Mullen | Jan. 14, 1941 |
| 2,232,753 | Wilson | Feb. 25, 1941 |
| 2,287,297 | Dewey | June 23, 1942 |
| 2,316,940 | Dewey et al. | Apr. 20, 1943 |
| 2,346,007 | Chillson | Apr. 4, 1944 |
| 2,347,153 | Hagen et al. | Apr. 18, 1944 |
| 2,354,948 | Dewey | Aug. 1, 1944 |

FOREIGN PATENTS

| Number | Country | Date |
|---|---|---|
| 475,329 | Great Britain | Nov. 17, 1937 |
| 538,182 | Great Britain | July 24, 1941 |
| 549,591 | Great Britain | Nov. 27, 1942 |